(12) United States Patent
Muraji (10) Patent No.: US 6,437,962 B1
(45) Date of Patent: Aug. 20, 2002

(54) ELECTROMAGNETIC ACTUATOR WITH FUNCTION DETECTING POSITION OF DRIVEN MEMBER

(75) Inventor: Tetsuo Muraji, Odawara (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 09/286,821

(22) Filed: Apr. 6, 1999

(30) Foreign Application Priority Data

| Apr. 8, 1998 | (JP) | 10-095102 |
| Feb. 22, 1999 | (JP) | 11-043229 |

(51) Int. Cl.[7] .......................................... H02K 33/00
(52) U.S. Cl. ...................................... 361/170; 361/160
(58) Field of Search .............................. 361/170, 177, 361/179, 160, 154, 155; 335/81, 78

(56) References Cited

U.S. PATENT DOCUMENTS

| 3,671,814 A | * | 6/1972 | Dick | 317/123 |
| 4,434,450 A | * | 2/1984 | Gareis | 361/152 |
| 4,659,969 A | * | 4/1987 | Stupak, Jr. | 318/128 |
| 4,769,803 A | * | 9/1988 | Yamamiya | 369/46 |
| 5,003,211 A | * | 3/1991 | Groom | 310/90.5 |
| 5,164,668 A | * | 11/1992 | Alfors | 324/207.2 |
| 5,264,896 A | * | 11/1993 | Lee et al. | 354/435 |

FOREIGN PATENT DOCUMENTS

JP          08275460          10/1996

* cited by examiner

Primary Examiner—Fritz Fleming
(74) Attorney, Agent, or Firm—Perman & Green, LLP (57) ABSTRACT

An electromagnetic actuator can precisely detect the position of a driven member by detecting a magnetic flux density at a portion where the magnetic flux is condensed. The electromagnetic actuator comprises magnetic flux density detecting means disposed in a gap formed within a magnet flux formation section that is wound by an electromagnetic coil, for detecting a magnetic flux density within the gap; current value detecting means for detecting a current flowing through the electromagnetic coil; and calculating means for calculating a position of a movable member on the basis of the magnetic flux density detected by the magnetic flux density detection means and the current value detected by the current detection means.

5 Claims, 8 Drawing Sheets

ELECTROMAGNETIC ACTUATOR WITH FUNCTION DETECTING POSITION OF DRIVEN MEMBER

BACKGROUND OF THE INVENTION

1. Field of the Invention

The present invention relates to an electromagnetic actuator and, in particular, especially to an electromagnetic actuator which can drive a driven member while detecting a position of the driven member.

2. Description of Related Art

Figure 1:
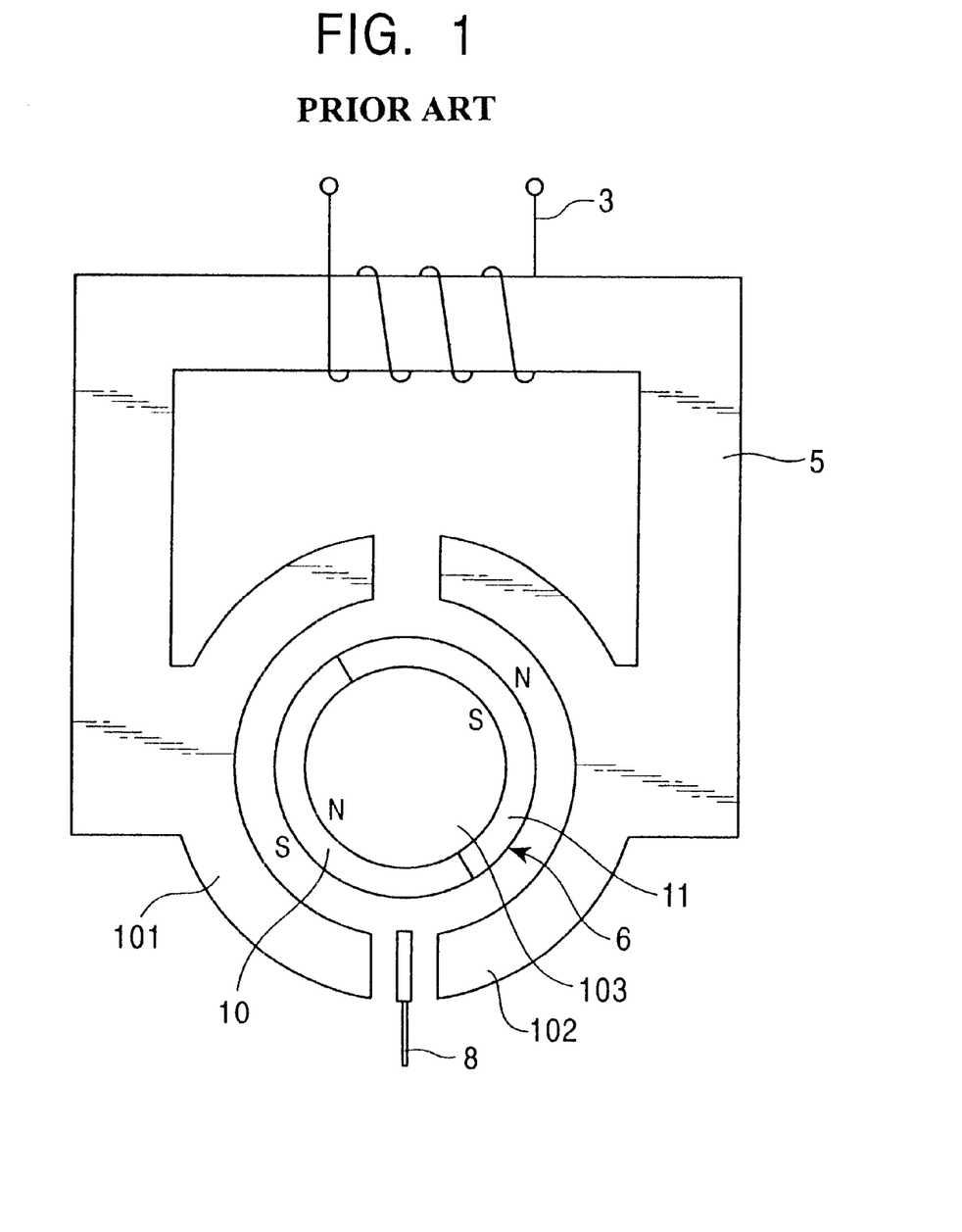
FIG. 1 is a front view showing a conventional electromagnetic actuator.

An electromagnetic actuator which drives a driven member has needed a position sensor for detecting an actual position of the driven member which sensor is separate from the electromagnetic actuator itself. To solve this problem, as well as to make the costs lower and to save space, the applicant proposed such an electromagnetic actuator which involves a movable member as a driven member being driven while detecting the actual position of the movable member in Japanese Patent Kokai 8-275460. The outline of this apparatus is as shown in FIG. 1. In FIG. 1, an electromagnetic coil 3 is wound around a yoke 5. A pair of magnetic poles 101 and 102 of the yoke 5 are located to face each other via an air gap to distribute a magnetic flux thereby to form a magnetic field therebetween. Within the magnetic field between the magnetic poles 101 and 102, there is disposed a rotor 6 made of magnetic component 103 provided with a pair of permanent magnets 10 and 11. Moreover, a Hall sensor 8 which detects the magnetic flux density is provided in the proximity area between magnetic poles 101 and 102. It is now apparent that this apparatus is an electromagnetic actuator which rotates the rotor 6 up to a desired angular position by the varying strength of a magnetic field established by a magnetic flux formed inside the yoke 5, the magnetic flux being formed by supplying a source current to the electromagnetic coil 3.

However, this type of electromagnetic actuator has such an inconvenience that the detection sensitivity of this type remains low because the Hall sensor 8 detecting the rotation angle of rotor 6 is located in the magnetic field formed by the magnetic flux distributed by the magnetic coil 3, and the density of magnetic flux passing through the Hall sensor is low. Moreover, there is another inconvenience that, freedom in design of a driving mechanism in the electromagnetic actuator is restricted in order to spare some space for a Hall sensor to be provided. Furthermore, there even happened that a Hall sensor could not be installed with the driving mechanism because of restrictions in structure of driving mechanism.

When, moreover, there adopted such a design that the voltage signal emitted from a Hall sensor is processed after detecting the sample value by a sampling circuit, that is, for example, a voltage signal is incorporated through the analog-digital conversion circuit and is processed based on the obtained sample value, a voltage transformation circuit is needed to transform the voltage signal received from a Hall sensor into a voltage signal having a voltage level appropriate to the input range of the sampling circuit. If the circuit is so composed as mentioned above, the amplification rate of the voltage transformation circuit is to be adjusted in accordance with the sensitivity of the Hall sensor or the dispersion of the resistance values of circuit components, thereby causing the costs to rise up or needing an improved accuracy in the adjustment.

OBJECT AND SUMMARY OF THE INVENTION

The present invention has been made to solve such problems mentioned above and to provide an electromagnetic actuator which can detect precisely the location of the driven member by detecting the density of magnetic flux where the density is high. The driving mechanism does not need the design change thereof. The position sensor is applicable for different structures of the driving mechanism. The actuator can detect precisely the position of the driven member by obtaining a voltage value of the voltage signal emitted from the Hall sensor with an appropriate resolution while being easily adjusted.

According to the present invention, an electromagnetic actuator comprises: a magnetic path component which is composed of a magnetic flux formation section provided with an electromagnetic coil and of a magnetic field formation part which causes a magnetic flux to form a magnetic field; a movable member which is disposed within said magnetic field and has magnetized surfaces differently magnetized from each other being movable in accordance with changes of said magnetic field, said magnetic field formation section having a plurality of magnetic poles corresponding to the magnetized surfaces of said movable member, so as to drive said movable member, and said magnetic path member having a magnetic gap at a magnetic path connecting said magnetic flux formation section with said magnetic pieces or within said magnetic flux formation section; magnetic flux density detecting means installed within said magnetic gap, for detecting said magnetic flux density distributed within said magnetic gap; detection means for detecting a magnitude of an electric current flowing through said electromagnetic coil; and calculating means for calculating the position of said movable member on the basis of the value of the magnetic flux density detected by said magnetic flux density detection means and on the magnitude of the current detected by said current detection means.

An electromagnetic actuator according to the present invention can precisely detect the position of a driven member since the magnetic flux density is detected at the magnetic gap provided within the magnetic flux forming means. Furthermore, with this arrangement it makes needless to change the design of the driving mechanism and enables this magnetic flux density detecting means to use together with different structure of a driving mechanism.

DETAILED DESCRIPTION OF PREFERRED EMBODIMENT

Description is made hereinafter for preferred embodiments of the present invention while referring to the drawings.

Figure 2:
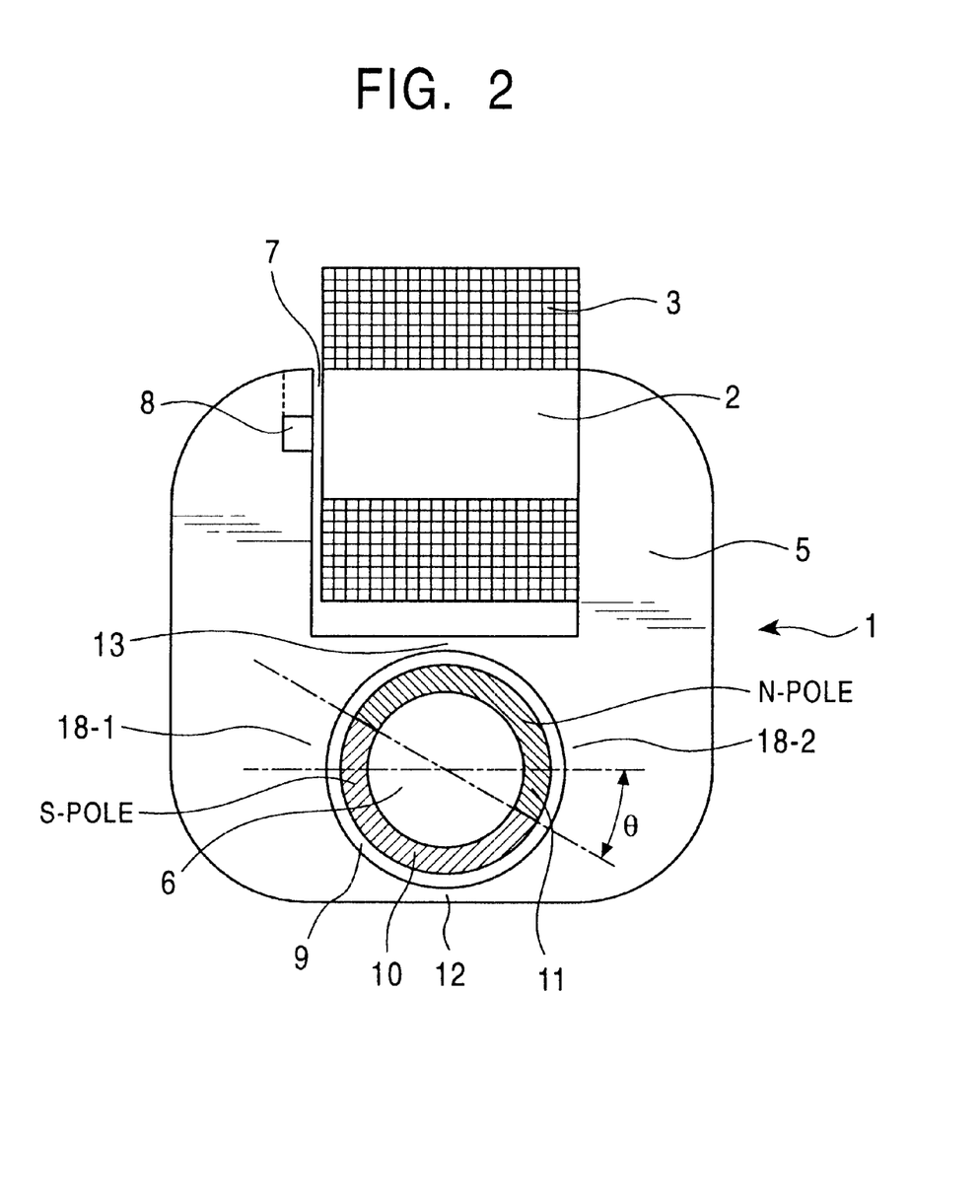
FIG. 2 is a sectional view showing an electromagnetic actuator of a first embodiment of the present invention.

FIG. 2 shows an electromagnetic actuator as a first embodiment of the present invention.

Figure 3:
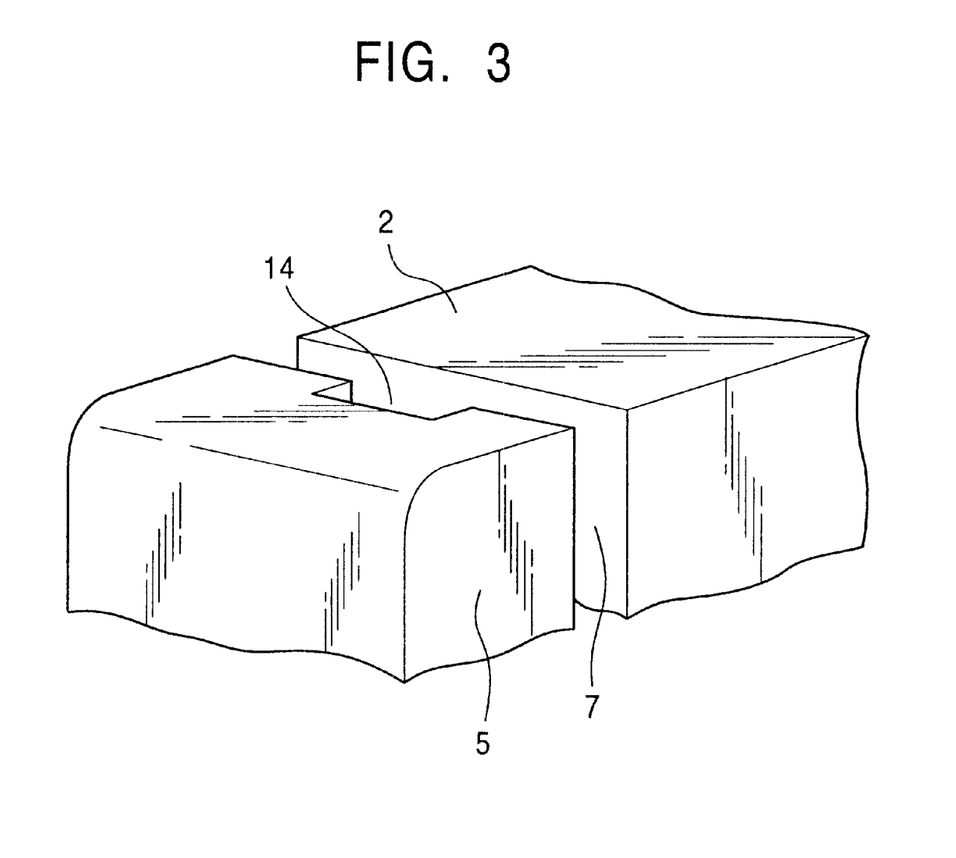
FIG. 3 is an expanded perspective view showing an electromagnetic gap section of the electromagnetic actuator shown in FIG. 2.

A core section 2 which is a magnetic flux formation section of the electromagnetic actuator 1 is provided with an electromagnetic coil 3 wound therearound. The electromagnetic coil 3 is connected to a power source (not shown) and a current from the power source is supplied to the electromagnetic coil 3. To one end of the core section 2, an electromagnetic component yoke 5 is connected, and the other end of the core section 2 faces toward the yoke 5 via a magnetic gap 7. Within the yoke 5 is formed an opening 9 within which a rotor 6 i.e. movable member is provided without touching the inside wall of opening 9 while facing magnetic pieces of 18-1 and 18-2. The rotor 6 is made of a magnetic material. The surface of the rotor 6 is magnetized so as to produce different poles, for example such permanent magnets 10 and 11. Permanent magnets 10 and 11 are magnetized in the opposite directions. For example the permanents magnets 10 and 11 are magnetized as the S and N poles. The yoke 5 at both sides of the opening 9 are narrow areas 12 and 13 which serve as a pair of magnetic reluctance functioning to conserve the magnetic energy of the magnetic flux passing therethrough. These areas 12 and 13 are referred to as magnetic reluctance sections hereinafter. The yoke 5 is provided with a slot 14 near the magnetic gap 7 as shown, for example, in FIG. 3. A Hall sensor 8 is to be provided at the slot 14 in order to detect a magnetic flux density passing through the magnetic gap 7. This Hall sensor 8 produces a voltage signal representing the detected magnetic flux density. When, with the arrangements mentioned above, the power source current is supplied to the electromagnetic coil 3, a magnetic flux is formed inside the core section 2 and the formed magnetic flux produces a magnetic field in the space of the opening 9 of the yoke 5.

As the magnetic gap 7 has relatively a large magnetic reluctance compared to the magnetic power of permanent magnets 10 and 11, each of magnetic fluxes formed by the permanent magnets 10 and 11 can form a loop only within small pieces of magnetic poles 18-1 and 18-2 each having less magnetic reluctance, thereby causing the rotor 6 is made stable as long as no current is supplied to the electromagnetic coil 3. When, therefore no current is supplied to the electromagnetic coil 3, the rotor 6 always returns to a predetermined reference position so as to take a stable state. When, on the other hand, a current is supplied to the electromagnetic coil 3, the magnetic flux formed by the electromagnetic coil 3 passes through the magnetic gap 7 so as to form a loop which passes through the yoke 5. In this instance, magnetic saturation arises only by a slight magnetic flux formed in the magnetic reluctance sections 12 and 13, since the magnetic reluctance sections 12 and 13 have narrow cross-sectional areas. There can not be formed more magnetic flux than the predetermined magnetic flux in the magnetic reluctance sections 12 and 13 even if the current supplied to the electromagnetic coil 3 increases. When, therefore a current is supplied to the electromagnetic coil 3, a most part of magnetic flux generated by the electromagnetic coil 3 is going to form the loop passing through the opening 9 where magnetic reluctance is low so that the rotor 6 rotates up to the predetermined position. The electromagnetic actuator 1 drives a driven member connected with the rotor 6, for example, such as a throttle valve provided at an intake system of an internal-combustion engine because of such rotation operation of the rotor 6 as mentioned above.

Figure 4:
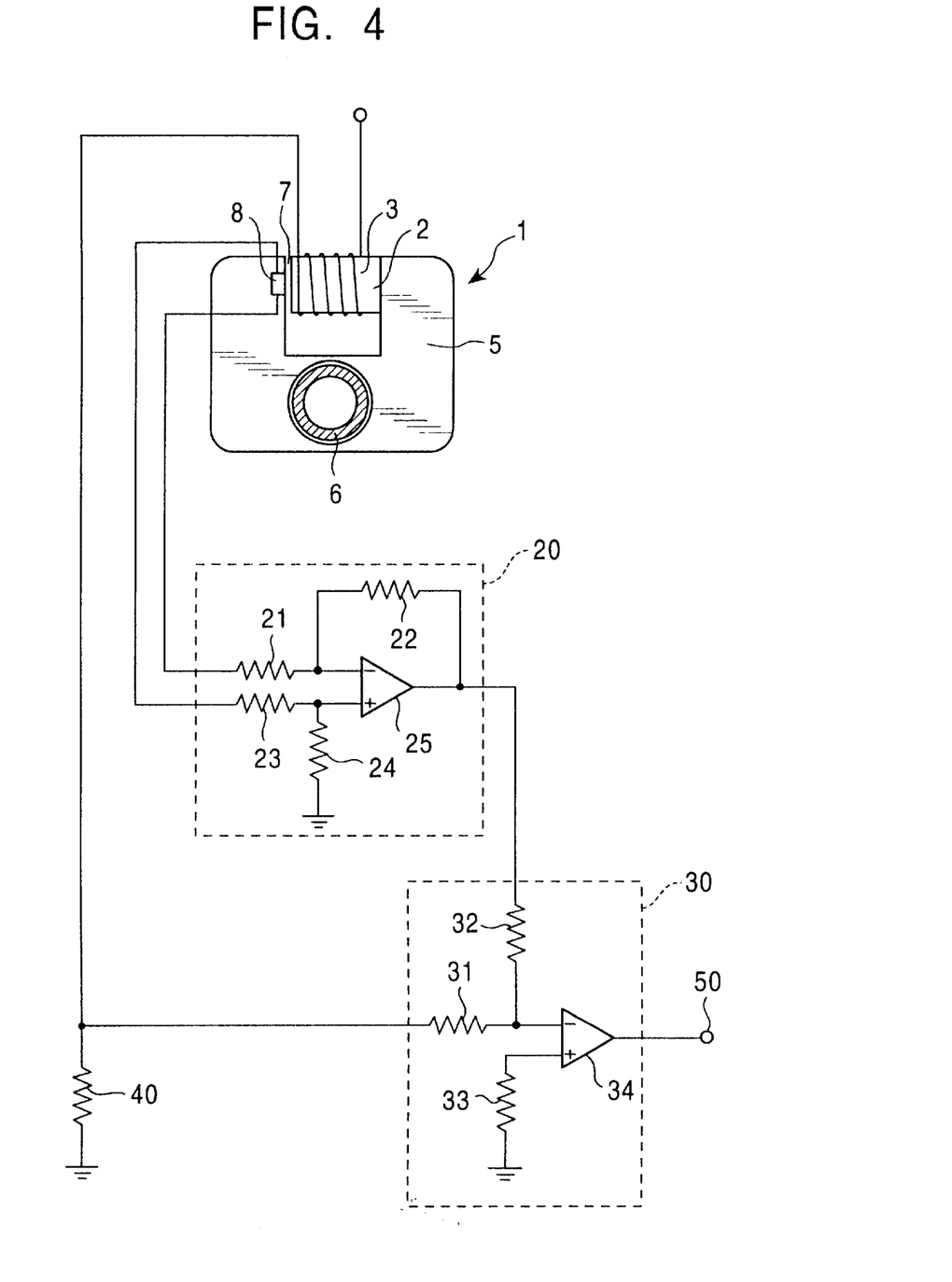
FIG. 4 is a circuit diagram showing a circuit including an electromagnetic actuator and detecting circuit for detecting a rotation angle of a rotor.

FIG. 4 shows the electromagnetic actuator and a circuit for detecting a rotation angle of the rotor. Here, the same reference numerals are used for referring to counterparts shown in FIG. 2. One end of the output line of the Hall sensor 8 is connected to a negative terminal of an operational amplifier 25 via a resistor 21 of a differential amplifier 20. The other output line of the Hall sensor 8 is connected to a positive terminal of the operational amplifier 25 via resistors 23 and 24. An output terminal of the operational amplifier 25 is connected to the negative terminal of the operational amplifier 25 via the resistor 22, and is also connected to the negative terminal of an operational amplifier 34 of an adder amplifier 30 via a resistor 32.

The electromagnetic coil 3 has one end thereof connected to the power source (not shown) and the other end thereof connected to a resistor 40. A connecting point between the electromagnetic coil 3 and the resistor 40 is connected to the negative terminal of an operational amplifier 34 via a resistor 31. Furthermore, the positive-electrode terminal of the operational amplifier 34 is grounded via the resistor 33. An output signal of the operational amplifier 34 is emitted through an output terminal 50.

Figure 5:
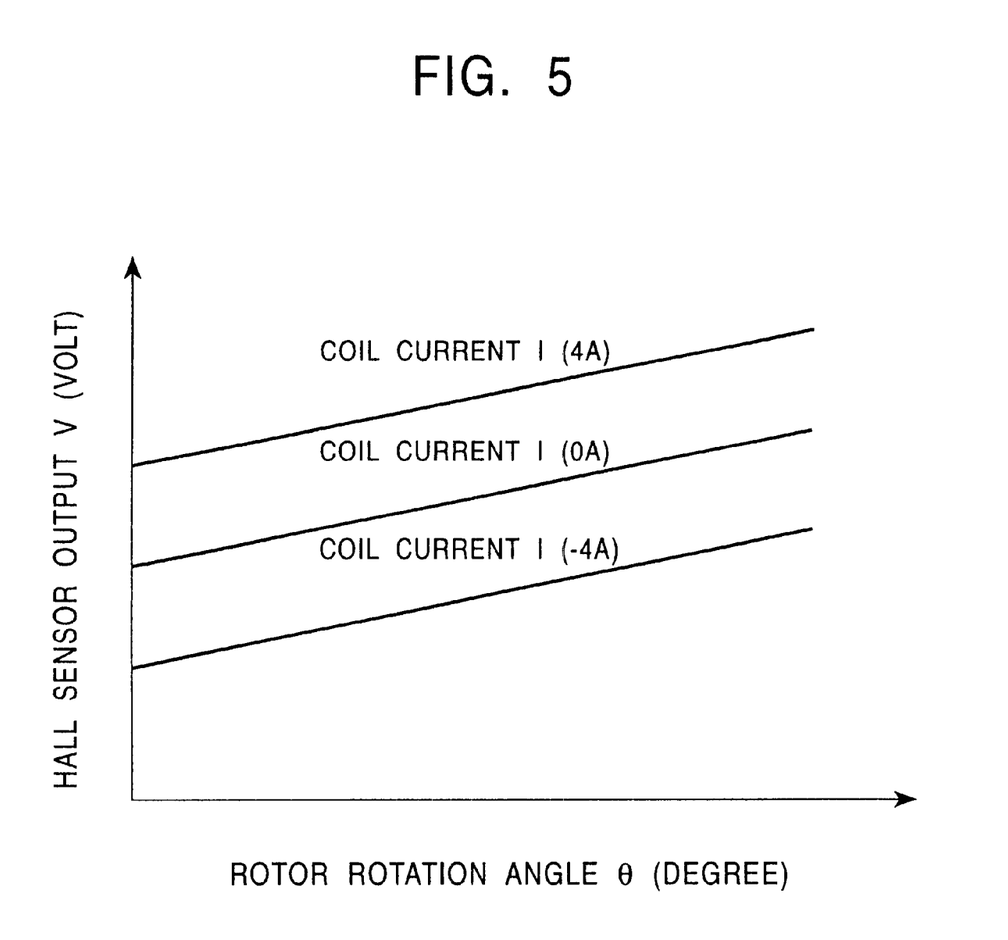
FIG. 5 is a graph showing relations between a rotor rotational angle of an electromagnetic actuator and an output voltage of a Hall sensor shown in FIG. 2.

FIG. 5 shows a relation between the rotation angle of the electromagnetic actuator and the output voltage of the Hall sensor in the first embodiment of the present invention.

As shown in FIG. 5, the relation between rotation angle $\theta$ and the output voltage V from the Hall sensor can be approximated, for example, by means of a primary function. When a current I supplied to the electromagnetic coil changes, the angle $\theta$ can be expressed as a primary function having the inclination but different values of at $\theta=0$. These relations are obtained through a preparatory experiments while using an actual device and can be expressed, for example, with a relational formula like $\theta=AV+BI+C$. Here, A, B, and C are constants, for example, the values of them being expressed by $A=2.98$, $B=-0.59$, and $C=4.93$.

The differential amplifier 20 and the adder amplifier 30 shown in FIG. 4 already mentioned above calculate such relational expression as mentioned above, and output the voltage value corresponding to the rotation angle $\theta$ of the rotor 6. Therefore, the resistance values of the resistor 21–24 in the differential amplifier 20, of the resistors 31–33 in the adder amplifier 30 and of the resistor 40 are so selected as to realize the values of the constants A, B, and C mentioned above.

Figure 6:
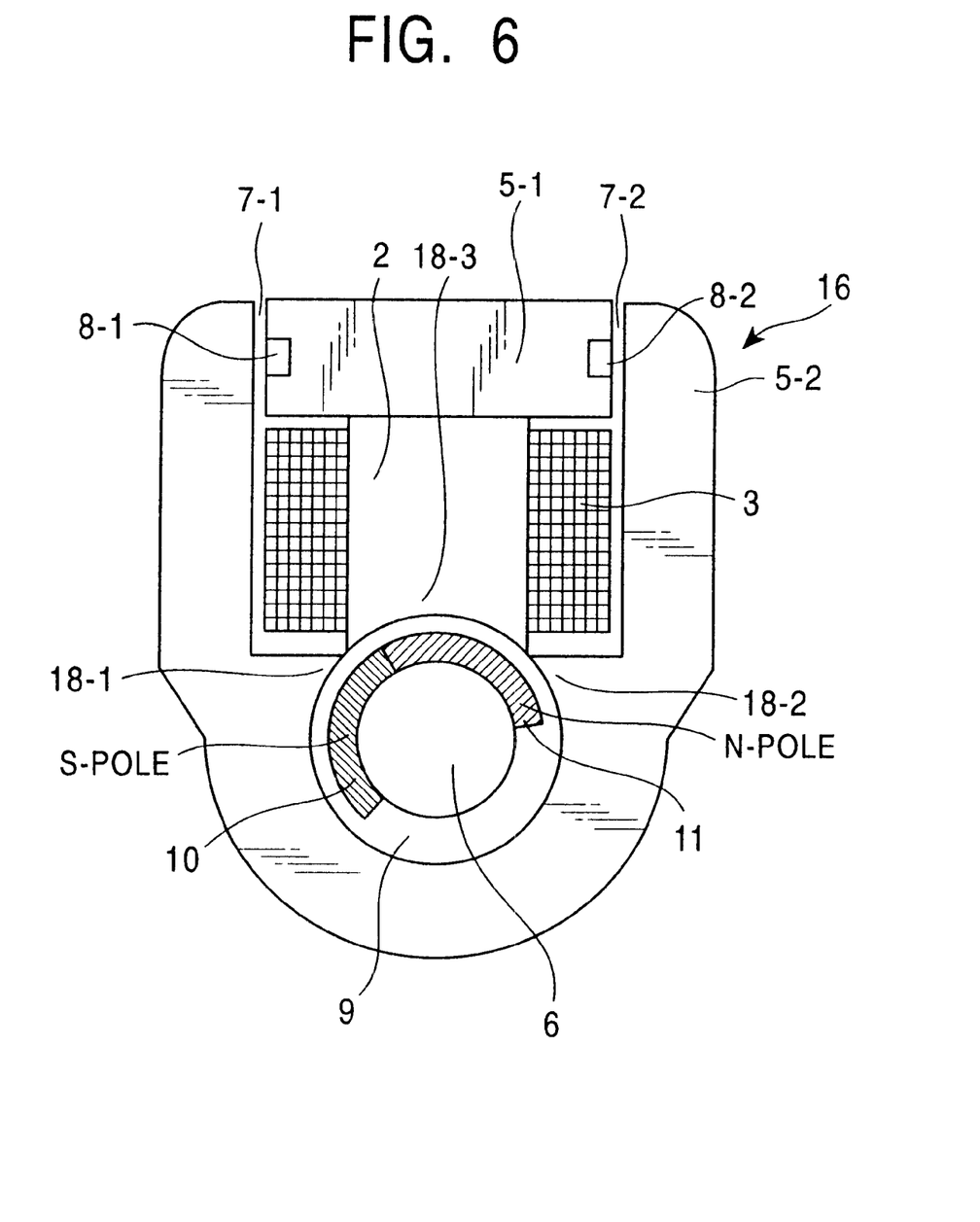
FIG. 6 is a sectional view showing an electromagnetic actuator that is a second embodiment of the present invention.

FIG. 6 is a sectional drawing view showing the electromagnetic actuator of a second embodiment of the present invention. Here, the same reference numerals are used for denoting counterparts of that shown in FIG. 2. A yoke 5-2 faces at both ends thereof both ends of a yoke 5-1 via magnetic gaps 7-1 and 7-2. Hall sensors 8-1 and 8-2 are installed at both ends of the yoke 5-1. Hall sensors 8-1 and 8-2 detect a magnetic flux density which passes through the magnetic gap 7-1 and 7-2. As two Hall sensors 8-1 and 8-2 are provided, the flux density can precisely be detected even if one of them fails. An opening 9 is formed in a yoke piece 5-2, where a rotor 6 i. e. a movable member is inserted in the opening 9 without touching the inside wall of the opening 9 and is arranged such that rotor 6 faces to magnetic poles 18-1, 18-2 and 18-3. The rotor 6 is made of a magnetic material and magnetized so as to produce different magnetic poles on the surface thereof such as permanent magnets 10 and 11. In this electromagnetic actuator 16 similar to the electromagnetic actuator 1 mentioned above, the rotor 6 always returns to a reference position when no power source current is supplied to the electromagnetic coil 3. When the electromagnetic coil 3 is supplied with a power source current, the rotor 6 rotates up to a predetermined angle. The rotation angle of the rotor 6 can be calculated by such a circuit as shown in FIG. 4.

In the electromagnetic actuator 1 shown in FIG. 2 even if either of the Hall sensors fails, the magnetic flux density can be precisely detected to calculate the rotation angle of the rotor 6 by providing Hall sensors at both sides of the electromagnetic coil 3.

Figure 7:
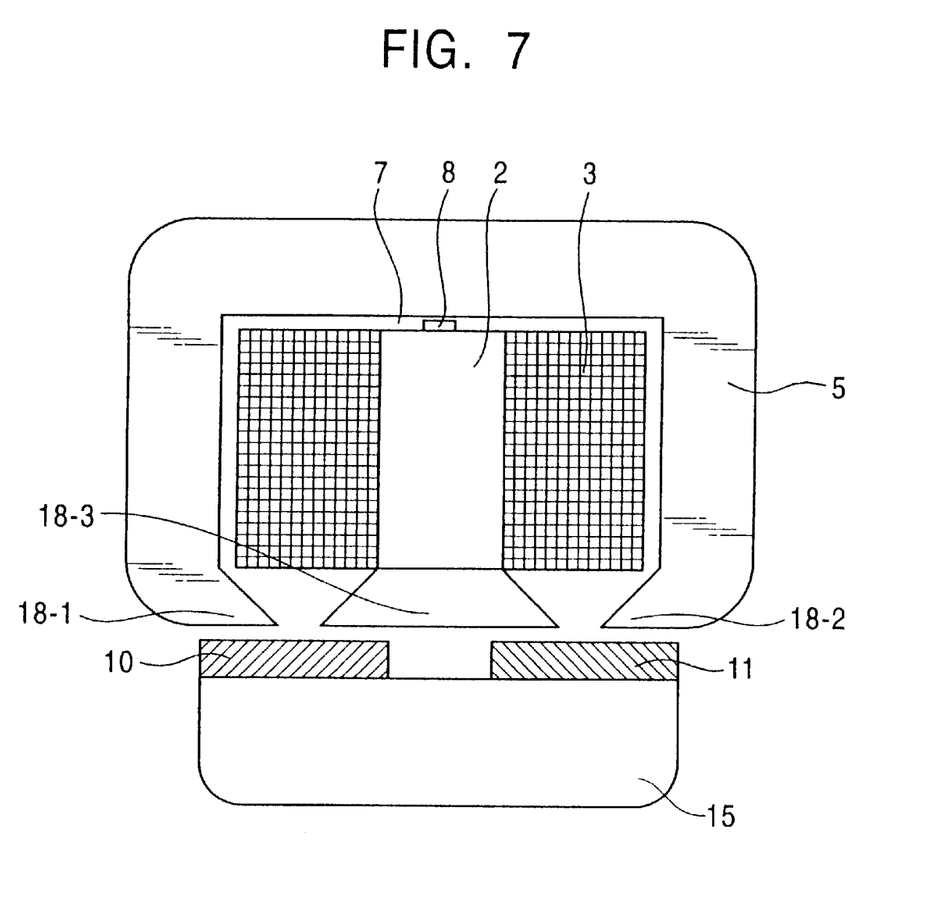
FIG. 7 is a sectional view showing an electromagnetic actuator that is a third embodiment of the present invention.

FIG. 7 is a sectional view showing an electromagnetic actuator of a third embodiment of the present invention. The counterparts of the devices shown in FIGS. 2 and 7 are designated by the same reference numerals as each there.

A magnetic gap 7 is disposed between a core section 2 and a yoke 5 of electromagnetic actuator 17. Within the magnetic gap 7 is provided a Hall sensor 8 for detecting magnetic flux density which passes through the gap 7. A slide block 15 which is slidable along a supporting member (not shown) made of a magnetic material is provided in such a manner that slide block 15 does not contact to the yoke 5, while facing magnetic pole pieces 18-1, 18-2 and 18-3. The slide block 15 is equipped with permanent magnets 10 and 11.

When a current is not supplied from the power source to the electromagnetic coil 3, the slide block 15 is urged to take such a home position the magnetic flux formed by permanent magnet 10 and 11 distributes symmetrically on a plane of FIG. 7 while being urged to always return to the home position. When, on the other hand, a current is supplied from the power source to the electromagnetic coil 3, the slide block 15 is caused to move up to a predetermined position. The position of this slide block 15 can be calculated by such a circuit as shown in FIG. 4.

Figure 8:
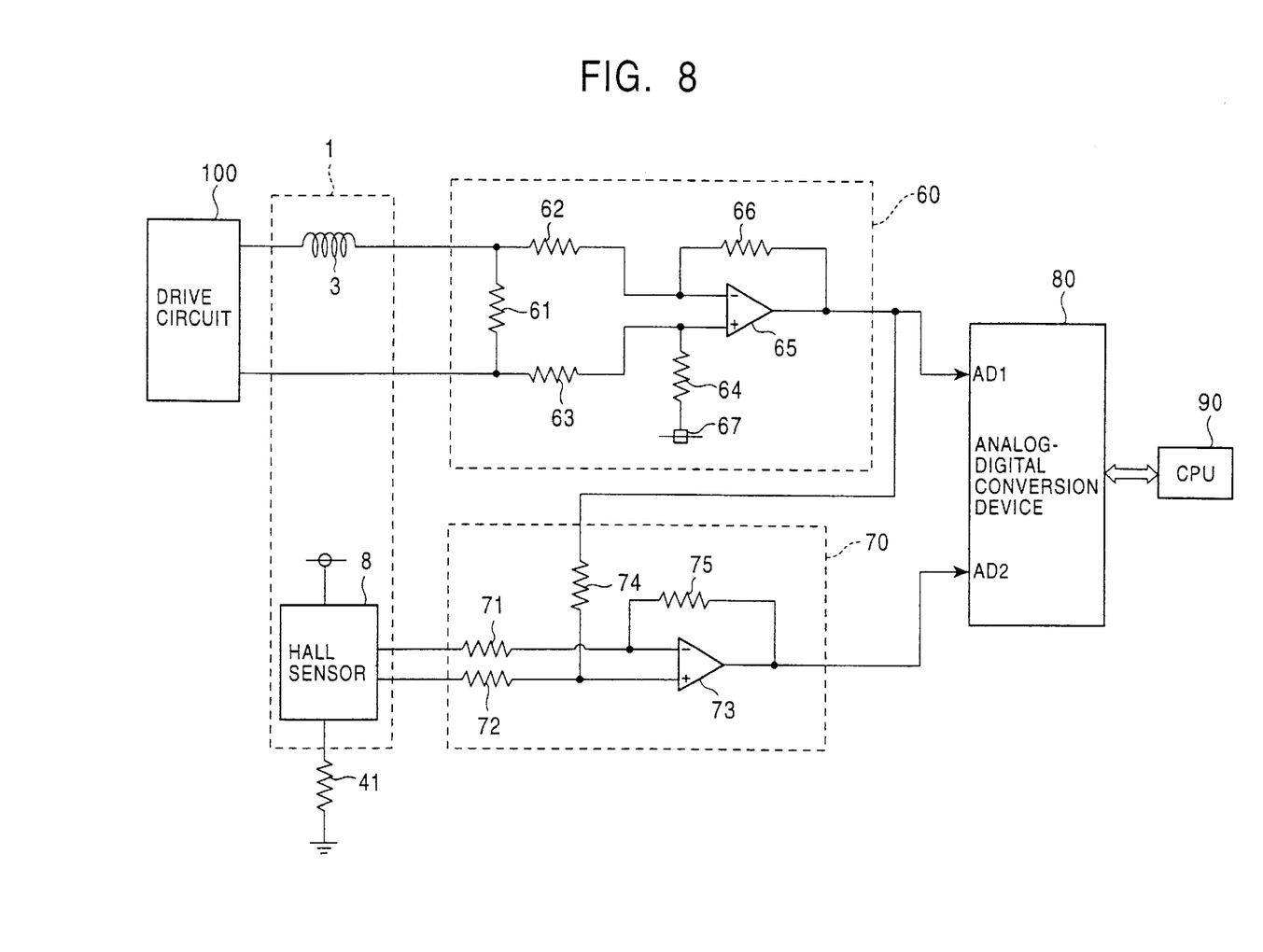
FIG. 8 is a circuit diagram which receives both of a drive current voltage signal and of a difference between a voltage value of a flux-density voltage signal and a voltage value of a drive current voltage signal in the fourth embodiment.

FIG. 8 shows a circuit diagram of a fourth embodiment of the present invention that detects a rotation angle of a rotor. The counter parts of the devices shown in FIGS. 4 and 8 are designated by the same reference numerals as each there. A drive current I emitted from a drive circuit 100 is supplied to a coil 3 in an electromagnetic actuator 1 and is converted into a voltage signal (referred to as a drive current voltage signal hereinafter) by means of a resistor 61 in an operation circuit 60. The drive current voltage signal is supplied to the positive and negative terminals of an operational amplifier 65 via resistors 62 and 63. The positive terminal of the operational amplifier 65 is connected to a power source 67 that supplies predetermined voltage of, for example, 2.5 (V), via a resistor 64. The negative terminal of the operational amplifier 65 is, on the other hand, connected to an output terminal of the operational amplifier 65 via a resistor 66. The output terminal of the operational amplifier 65 is connected to one port AD1 of an analog-digital converter 80. After the operation circuit 60 converts the drive current I supplied to the coil 3 into a drive current voltage signal by using the resistor 61, it amplifies the drive current voltage signal at an amplification factor determined by resistors 62, 63, 64, and 66 to supply the resultant to the analog-digital converter 80.

The voltage signal having a voltage value (referred to as a magnetic flux density voltage signal hereinafter) representing the magnetic flux density of the magnetic flux generated by the coil 3 is emitted from the Hall sensor 8 provided in the electromagnetic actuator 1. This magnetic flux density voltage signal is supplied respectively to positive and negative terminals of an operational amplifier 73 via resistors 71 and 72 in a subtraction circuit 70. The positive terminal of the operational amplifier 73 is connected to the output terminal of the operational amplifier 65 via a resistor 74. The negative terminal of the operational amplifier 73 is connected to the output terminal of the operational amplifier 73 via a resistor 75. The output terminal of operational amplifier 73 is connected to a port AD2 of the analog-digital converter 80. The operation circuit 70 amplifies the voltage signal representing a subtraction between the magnetic flux density voltage signal detected by the Hall sensor 8, which is connected to ground via resistor 41, and the drive voltage signal emitted from the operational amplifier 65 at an amplification factor determined by resistors 71, 72, 74 and 75 to supply to the analog-digital converter 80.

An analog-digital converter 80 is connected to a central processing unit (referred to as CPU hereinafter) 90. The analog-digital converter 80 supplies a sample value of the voltage subtraction V minus Vi to CPU 90 in response to a command from CPU 90, where Vi represents a sample voltage value of a drive current voltage signal and V represents a voltage value of the magnetic flux density voltage signal. CPU 90 calculates the voltage value V of a magnetic flux density voltage signal by an additional processing of these sample values and calculates the drive current I from the voltage value Vi representing the drive current and then CPU 90 calculates a rotation angle θ of a rotor 6 on the basis of a formula θ=AV+BI+C as mentioned above while using the resultant voltage V and drive current I.

Since the drive current voltage signal Vi and of the subtraction voltage signal having the voltage value V minus Vi are respectively supplied to the analog-digital converter 80 as mentioned above, the voltage change of the subtraction of voltage signal (V–Vi) can be controlled at a low level, even if the voltage value Vi of the drive current voltage signal changes largely. It is because the subtraction voltage signal is reduced by the drive current voltage signal Vi. Even when an amplification factor of subtraction voltage signal is raised in order to effectively use the resolution of the analog-digital converter 80, the subtraction voltage signal can fall within the input range, for example 0~5 volts, of the analog-digital converter 80. The analog-digital converter 80 can operate over a preferred range for the magnetic flux density voltage signal with suitable resolution and can precisely detect the present position of the rotor 6 i.e. the driven member. Such advantages are derived from the arrangement mentioned above which is much better than such a constitution that the magnetic flux density voltage signal is directly supplied to an analog-digital converter 80.

When the electromagnetic actuator is to be adjusted, a previous adjustment process can be preferably done by supplying the predetermined values of the drive current I. Those predetermined values are those corresponding to predetermined positions of the rotor 6, for example, fully-open and fully-closed positions of a throttle valve of an internal-combustion engine being linked to the rotor 6. The values of drive current I are detected at the respective positions mentioned above. The values of the drive current voltage signal Vi and the value of the subtraction voltage V–Vi shall be preferably memorized, for example, in a ROM (not shown) as a set of initial values (referred to as I, V0, and Vi0 hereinafter). When the electromagnetic actuator is in use, a position of the driven member can be precisely detected while compensating the values of current I, the voltage V and the voltage Vi in comparison with the initial values of I0, V0 and Vi0 mentioned above. The electromagnetic actuator is free from influence of the changes in sensitivity of the Hall sensors and dispersions of resistors in the circuit while the adjustment can be done for the actuator.

Although the fourth embodiment of the present invention as mentioned above, has been incorporated with the electromagnetic actuator 1 of the first embodiment, the electromagnetic actuator 16 of the second embodiment and the electromagnetic actuator 17 of the third embodiment of the present invention can be used for the fourth embodiment.

Since the electromagnetic actuator according to the present invention detects the magnetic flux density at the magnetic gap provided within the magnetic flux formation section as mentioned above, it can precisely detect the density of the magnetic flux and the position of a driven member. Because of the magnetic flux density detection means being installed in the magnetic gap, it is unnecessary to change the drive mechanism design and the magnetic flux density detection means can be used even together with the drive mechanism that has a different structure. The voltage value of the voltage signal emitted from the magnetic flux density detection means can be obtained with suitable resolution and the present position of a driven member can be precisely detected.

What is claimed is:

1. An electromagnetic actuator which comprises:
   a magnetic flux generating part including an electromagnetic coil with a magnetic core having a pair of core ends;
   an approximately U-shaped magnetic member having a pair of leg portions including leg ends respectively confronting both core ends of said magnetic core at the leg ends thereof while forming at least one magnetic gap between either one of the pairs of leg ends and said core ends and having a bottom portion with an opening for forming a magnetic field therewithin;
   a movable member movably disposed within said opening and having a magnetized surface with different magnetic poles;
   a magnetic sensor positioned within said at least one magnetic gap for detecting a magnetic flux density within said magnetic gap;
   a current detector for detecting a current flowing through said electromagnetic coil; and
   signal generating means for generating a position signal representing a position of said movable member on the basis of the detected magnetic flux detected by said magnetic detector and the detected current detected by said current detector.

2. An electromagnetic actuator which comprises:
   a magnetic flux generating part including a magnetic rod having a pair of rod ends and an electromagnetic coil with a magnetic core having a pair of core ends, one end of said magnetic core confronting an intermediate portion of said magnetic rod;
   an approximately U-shaped magnetic member having a pair of leg portions including leg ends respectively confronting both rod ends of said magnetic rod at the leg ends thereof while forming at least one magnetic gap between either one of the pairs of leg ends and said rod ends and having a bottom portion with an opening in the proximity of the other end of said magnetic core, for forming a magnetic field therewithin;
   a movable member movably disposed within said opening and having a magnetized surface with different magnetic poles;
   a magnetic sensor positioned within said at least one magnetic gap for detecting a magnetic flux density within said magnetic gap;
   a current detector for detecting a current flowing through said electromagnetic coil; and
   signal generating means for generating a position signal representing a position of said movable member on the basis of the detected magnetic flux detected by said magnetic detector and the detected current detected by said current detector.

3. An electromagnetic actuator which comprises:
   a magnetic flux generating part including an electromagnetic coil with a magnetic core having a first end and a second end;
   an approximately U-shaped magnetic member having a bottom portion which confronts the first end of said magnetic core for forming a magnetic gap and having a pair of leg portions including leg ends confronting the second end of said magnetic core at the leg ends thereof for forming a pair of magnetic fields juxtaposed with each other around a pair of spaces between the second end and said pair of leg ends;
   a movable member movably disposed adjacent to said pair of spaces and having a magnetized surface provided with different magnetic poles positioned adjacent said pair of spaces;
   a magnetic sensor positioned within said magnetic gap for detecting a magnetic flux density within said magnetic gap;
   a current detector for detecting a current flowing through said electromagnetic coil; and
   signal generating means for generating a position signal representing a position of said movable member on the basis of the detected magnetic flux detected by said magnetic detector and the detected current detected by said current detector.

4. An electromagnetic actuator as defined in claims 1, 2, or 3, in which said signal generating means includes:
   subtraction means for producing a subtraction signal having a voltage representing a difference between said coil current signal and said magnetic flux density signal;
   sampling means for sampling each of said coil current signal and said subtraction signal;
   adder means for adding to each other the sampled values of the respective ones of said coil current signal and said subtraction signal so as to regenerate said magnetic flux density signal; and
   a signal generator for generating a calculation signal as said position signal on the basis of the regenerated magnetic flux density signal and said coil current signal.

5. An electromagnetic actuator according to claim 4, in which:
   said signal generator produces said calculation signal by applying a polynomial calculation to said generated magnetic flux density and said coil current signals.

* * * * *